FIP8106 XR 3,899,429

United States Patent [19]

Ueno et al.

[11] 3,899,429

[45] Aug. 12, 1975

[54] PULSE-FREQUENCY-MODULATION SIGNAL TRANSMISSION SYSTEM

[75] Inventors: Yoshito Ueno; Mitsuo Kajitani; Yoshio Ohgushi, all of Tokyo, Japan

[73] Assignee: Nippon Electric Company, Limited, Tokyo, Japan

[22] Filed: Oct. 24, 1972

[21] Appl. No.: 300,179

[30] Foreign Application Priority Data

Oct. 29, 1971 Japan ............................... 46-86418

[52] U.S. Cl. .................. 250/199; 325/143; 332/9 R

[51] Int. Cl.$^2$ ...................... H04B 9/00; H04L 25/00

[58] Field of Search ......... 250/199; 325/38 R, 38 B, 325/141, 142, 143, 321; 332/9 R, 9 T, 11 R, 14; 328/68, 28

[56] References Cited

UNITED STATES PATENTS

| | | | |
|---|---|---|---|
| 2,492,736 | 12/1949 | Custin | 325/142 X |
| 2,510,054 | 6/1950 | Alexander et al. | 325/141 |
| 2,662,118 | 12/1953 | Schouten et al. | 325/143 |
| 2,699,498 | 1/1955 | Guenther | 325/143 X |
| 3,366,881 | 1/1968 | Malone et al. | 325/143 |
| 3,370,285 | 2/1968 | Cruse et al. | 250/199 X |
| 3,534,351 | 10/1970 | Harnden, Jr. et al. | 250/199 X |
| 3,609,728 | 9/1971 | Quinn | 325/142 X |
| 3,624,558 | 11/1971 | Brolin | 325/38 B |

*Primary Examiner*—Benedict V. Safourek
*Attorney, Agent, or Firm*—Ostrolenk, Faber, Gerb & Soffen

[57] ABSTRACT

A pulse-frequency modulation signal eliminating the need for transmitting reference timing pulses. The level of the information signal to be transmitted is compared against the level of a ramp signal to generate a narrow output pulse which resets the ramp signal generator. The time spacing of the narrow pulses is a function of the level of the information signal. At the receiver end the received time spaced pulses control the resetting of a ramp generator whose output is filtered to reconstruct the original information signal. Each time spaced pulse thus acts as the time reference for the next received pulse.

3 Claims, 10 Drawing Figures

PULSE-FREQUENCY-MODULATION SIGNAL TRANSMISSION SYSTEM

This invention relates to a pulse-position-modulation (PPM) signal transmission system.

Figure 1A:
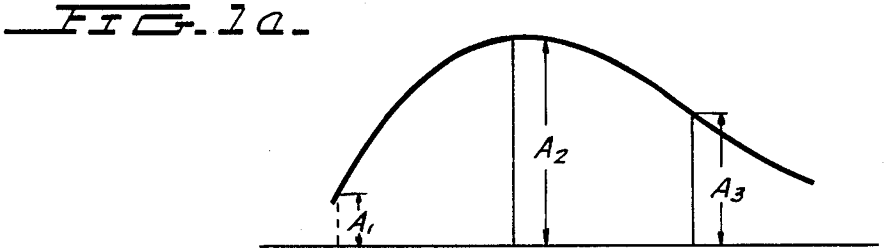
Figure 1B:
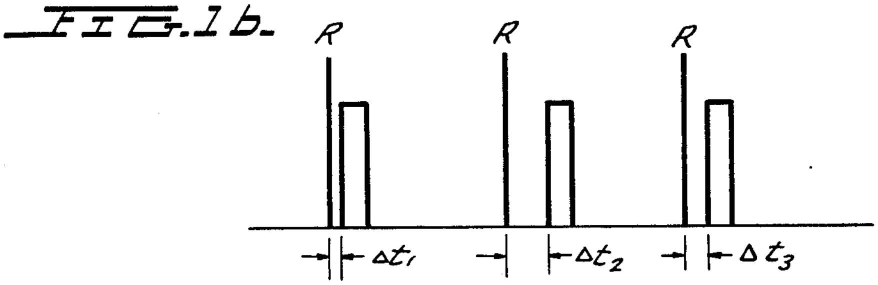

In the conventional PPM system, the analogue information signal is transmitted by varying the time interval $\Delta t_i$ between the actual signal pulse position and the reference time position R in response to the analogue signal level $A_i$ (sampled analogue signal level) as shown in FIG. 1. The reference time position R in this case is predetermined by the clock pulse train of a given repetition period generated by a clock pulse generator at the transmitting end. This makes it necessary to regenerate, at the receiving end, a clock pulse train timed with its counterpart at the transmitting end, in order to give the reference time position for the demodulation of the PPM signal.

There have been two principal proposals for meeting this requirement. In one of them, the synchronizing pulse is transmitted together with the information-representing pulses to allow the clock pulse to be regenerated at the receiving end to provide the reference time positions. This proposal is advantageous in that the frequency stability of the oscillator employed for the clock pulse regeneration need not be very high. But, on the other hand, a part of the transmission channels, which is otherwise available for the transmission of information signals, is always occupied by the synchronizing pulse, with a result that the transmission efficiency is lowered.

In the other of the proposals, the synchronizing pulse is not actually transmitted. Instead, the clock pulse component included in the transmitted pulse train is recovered at the receiving end to provide the reference time position. For the recovery of the clock component, a phase-lock loop must be employed. Furthermore, a highly stabilized oscillator free from the temperature-dependent frequency fluctuation is needed at each of the transmitting and receiving ends.

It is therefore one principal object of this invention to provide a pulse frequency-modulation signal transmission system featured by simple circuit structures which make it possible to dispense with the clock pulse generator and the clock extraction circuit, and thereby to improve transmission efficiency.

In accordance with a feature of this invention, a saw-tooth wave is used as the sampling pulse so that a pulse-frequency-modulated output may be developed at the instant where the level of the saw-tooth wave becomes coincident with the input signal level or where the difference between two levels reaches a predetermined value. At such instant, the level of the saw-tooth wave is brought back to zero. After the lapse of a predetermined period of time, the saw-tooth wave is again caused to build up. Also, at the receiving end, the saw-tooth wave is caused to build up after the lapse of a predetermined period of time from the time point where the incoming pulse is received. The same wave is brought back to zero level at the time point where the next pulse is supplied. In this way, it becomes possible to constitute a pulse-position modern system without resorting to the incorporation of the clock pulse into the pulse train for transmission since the immediately preceding pulse position serves to define the reference pulse position.

In the present invention, although a device for the generation of the saw-tooth wave is needed, the clock pulse generator and the clock extraction circuit, which are needed in the conventional system at the transmitting and receiving ends, respectively, is dispensed with.

Also, this invention eliminates the need for the extra channel for the clock pulse. Furthermore, the demodulated wave at the receiving end is less susceptible to ambient temperature changes and suffers less distortion than the conventional system, because the oscillator for generating the clock pulse is dispensed with.

A still further feature of this invention is its adaptability to a laser communication system, which is attributed to the simplified and miniaturized circuit structure resulting from dispensing with the clock pulse generator and the clock extraction circuit.

Figure 2A:
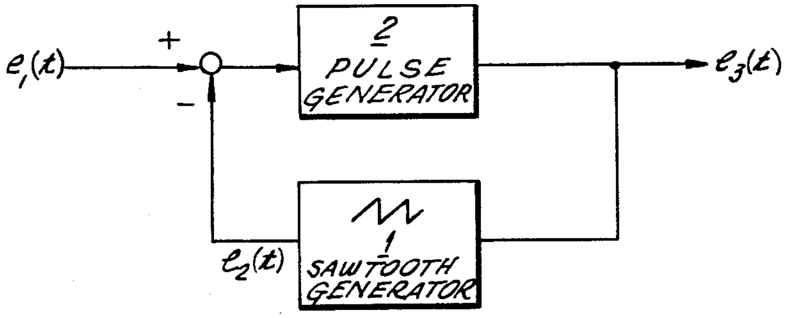
Figure 2B:
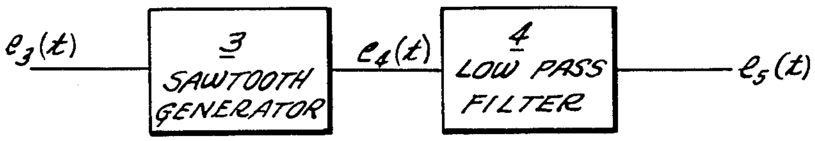
Figures 3A, 3B, 3C, 3D:
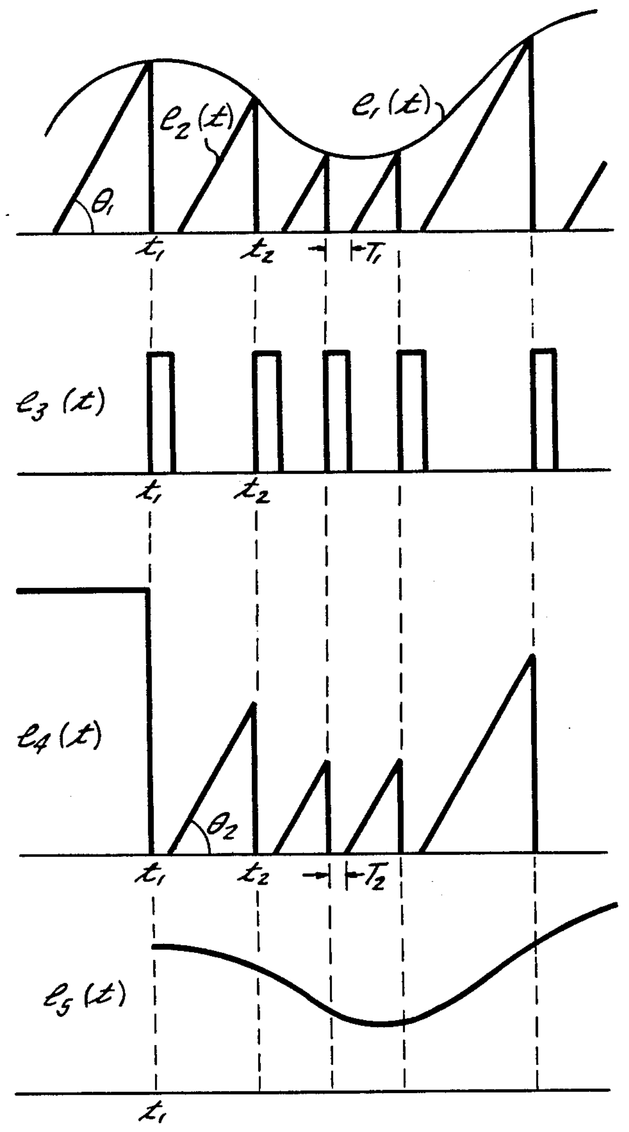
Figure 4A:
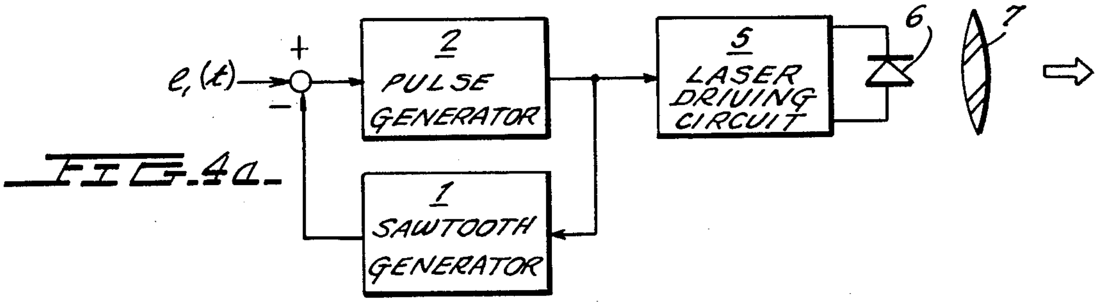
Figure 4B:
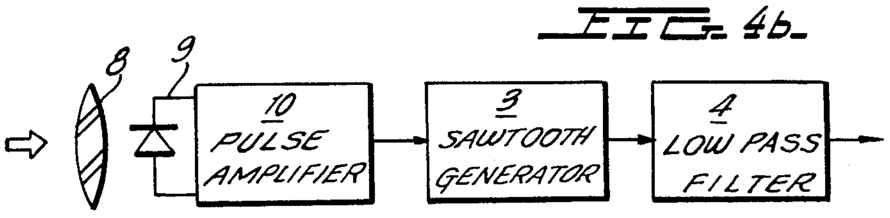

The foregoing and other objects and features of this invention will be better understood from the detailed description taken in conjunction with the accompanying drawings in which:

FIGS. 1*a* and 7*b* show the relationship between an input analogue signal and output signal pulses in a conventional analogue type PPM system;

FIGS. 2*a* and 2*b* show in block diagram form a PPM signal transmission system according to this invention;

FIGS. 3*a* through 3*d* show time charts illustrating the operation of the PPM system shown in FIG. 2; and FIGS. 4*a* and 4*b* are block diagrams of an example where this invention is applied to a semiconductor laser communication system.

Now the operation of the pulse-frequency-modulation system according to this invention will be explained by reference to FIGS. 2*a*, 2*b* and 3.

An input analogue signal $e_1(t)$ and a saw-tooth wave $e_2(t)$ generated by a saw-tooth wave generator 1 are level-compared with each other. At the time point $t_1$ (see FIG. 3*a*) where the level of a saw-tooth wave $e_2(t)$ becomes equal to the level of an input analogue signal $e_1(t)$, a pulse generator 2 consisting of an amplifier and a monostable multivibrator develops an output pulse $e_3(t)$. The output pulse $e_3(t)$ is transmitted as a transmitter output signal pulse. At the same time, the pulse $e_3(t)$ triggers the saw-tooth wave generator 1 to bring the level of the saw-tooth wave, which shows a linear increase with the lapse of time at a rate expressed by the angle $\theta_1$, back to zero level.

The level of the saw-tooth wave is increased after the lapse of a predetermined period of time $T_1$ to allow the generation of the next output pulse at the time point $t_2$, where the signal level and the saw-tooth level become equal to each other.

As shown at in FIG. 3*a*, the pulse spacing $(t_2 - t_1)$ is expressed as $$t_2 - t_1 = \frac{e_1(t_2)}{\tan\theta_1} + T_1 \quad (1)$$

It can be seen that the spacing $(t_2 - t_1)$ is in proportion to the level of the input signal $e_1(t)$. Thus, a train of pulses $e_3(t)$ (FIG. 3(*b*)) which has been pulse-position-modulated with the immediately preceding pulse serving as the reference time position, is generated.

On the receiving end, a saw-tooth wave generator 3 is provided, which develops a prescribed constant level output in the absence of a receiving input pulse train $e_3(t)$. The saw-tooth generator 3 is triggered by the incoming input pulse train $e_3(t)$ so that the amplitude level may be brought back to zero. After the lapse of a predetermined time $T_2$, the level increases in linear proportion to the lapse of time at a rate corresponding to angle $\theta_2$, and then is brought back to the zero level again on the arrival of the next input pulse $e_3(t)$.

The saw-tooth wave $e_4(t)$ developed by the saw-tooth wave generator 3 on the receiving end has, as will be understood from FIG. 3c, the following relationship with the time interval $(t_2 - t_1)$:

$$t_2 - t_1 = \frac{e_4(t_2)}{\tan\theta_2} + T_2 \qquad (2)$$

From equations (1) and (2), it follows that:

$$e_4(t_2) = \frac{\tan\theta_2}{\tan\theta_1} e_1(T_2) + \tan\theta_2(T_1 - T_2) \qquad (3)$$

This shows that a saw-tooth wave is regenerated whose envelope is proportional to the input signal $e_1(t)$. Consequently, an analogue $e_5(t)$ as shown at (d) in FIG. 3 is regenerated by causing the wave to pass through a low-pass filter 4 and removing from it the DC compound $\tan\theta_2(T_1 - T_2)$.

If the time interval $(t_2 - t_1)$ remains unchanged, when viewed at the transmitting and receiving ends, both the rates of increase given by gradients $\theta_1$ and $\theta_2$ and the predetermined times $T_1$ and $T_2$ may be designed to differ from each other. However, when $\theta_1$ and $\theta_2$ as well as $T_1$ and $T_2$ are equal, the regenerated wave $e_5(t)$ is the input wave $e_1(t)$ itself. Either or both of $T_1$ and $T_2$ may be zero.

In this way, a pulse is generated at the transmitting end every time the saw-tooth level becomes equal to the analogue signal level. It will be apparent, however, that the present embodiment may be modified to allow a pulse to be generated every time the level difference reaches a prescribed value.

The saw-tooth generator on both transmitting and receiving ends should be designed to be capable of the linear increase of the level until the level coincidence occurs between the saw-tooth wave and the signal. It should also be designed, as mentioned previously, to maintain the constant level at the saturation value when the level of the saw-tooth wave exceeds a prescribed level, for instance, the highest level of the input signal.

The technical advantage of this invention is distinct when applied to a single-channel (namely non-multiplex) semiconductor laser communication system. An example of such an application is shown in FIGS. 4a and 4b. Referring to FIG. 4a, an input analogue signal $e_1(t)$ is level-compared with the saw-tooth wave output of the saw-tooth generator 1 so that a pulse train may be developed by the pulse generator 2, whose pulse positions are shifted in proportion to the amplitude of the input analogue signal. As in the case of the example of FIG. 2, the pulse position coincides with the time point where both levels become equal to each other. The pulse train is supplied to a laser driving circuit 5, where it is converted into a large-amplitude pulses suited for driving a laser diode 6. A light pulse train emanating from the laser diode is transmitted through the transmitting lens 7. The light pulse train received by a receiving lens 8 is translated into an electrical pulse train by a photoelectric diode 9 as shown in FIG. 4b. The electrical pulse train is amplified by a receiving pulse amplifier 10 and then is caused to trigger a saw-tooth generator to generate a saw-tooth waves whose envelope corresponds to the input analogue signal. The saw-tooth wave, after passing through a low-pass filter 4, is translated into a regenerated signal identical to the input analogue signal.

The maximum duty factor of the pulse generated by the laser diode which is generally in use is of the order of 0.1 percent. Accordingly, it is impossible to extend the pulse width to a value greater than one-thousandth of the average pulse repetition period. Therefore, the pulse width must be narrowed in order to increase the pulse repetition frequency. For this reason, some troubles to be solved arise in case where a conventional PPM system is employed for a single-channel semiconductor laser communication system. In the conventional PPM system, the use of a pair of synchronizing pulses which are included in each frame constitutes the simplest in circuit structure. When such a system is employed in a single-channel semiconductor laser communication system, two synchronizing pulses are needed for one signal pulse, making it necessary to reduce the average pulse repetition period to one-third of that for the synchronizing-pulse-free system. This means that the pulse width must be reduced to one-third for the reduction of the pulse duty factor. It follows therefore that the bandwidth of both the laser diode driving circuit and the pulse amplifier disposed at the transmitting and the receiving ends, respectively, must be three times as large in pulse width as that for the information pulses without synchronizing pulses. This results in the necessity for the laser diode driving circuit having large pulse amplitude (ordinary several amperes), which is very difficult. Another problem to be solved is an increase in noise in the receiving circuit and the degradation of channel reliability of the laser communication system. To overcome these difficulties, use may be made of a system requiring no synchronizing pulse insertion or requiring insertion of only a limited number of synchronizing pulses, e.g., one for every several frames. However, the incorporation of the previously mentioned clock extraction circuit or the highly stabilized clock pulse generator is still indispensable.

In contrast, the pulse-frequency-modulation system of this invention requiring the transmission of no clock pulses make it possible to dispense with the clock generator or the extraction circuits.

Furthermore, since no synchronizing pulse is transmitted, both pulse repetition period and pulsewidth can be lengthened. This facilitates the manufacture of the laser driving circuit, reducing the noise which might otherwise appear at the receiving circuit, and making contribution to improvement in the channel reliability and the miniaturization of equipment installed at the transmitting and receiving ends.

What is claimed is:

1. A pulse-frequency-modulation system for transmitting and receiving analog signals and the like wherein the magnitude of the sampled analog signal is represented by the time spacing between successively transmitted narrow pulses, said system comprising:

a sawtooth generator;

circuit means for comparing the analog signal to be transmitted with the output of said sawtooth generator;

pulse generating means coupled to said comparison circuit for generating a narrow pulse when the level difference of the two inputs to the comparison circuit have a predetermined relationship;

the input of said sawtooth generator being coupled to the output of said pulse generator which is adapted to instantaneously reset the ramp signal of said sawtooth generator to zero level by said narrow pulse and thereby instantaneously initiating a successive ramp signal after said resetting operation to enable said circuit means to perform a subsequent comparison operation, whereby adjacent narrow pulses are time-spaced relative to one another as a function of the instantaneous level of the analog input signal to be transmitted.

2. The device of claim 1 wherein said pulse generator is a monostable multivibrator adapted to generate narrow pulses of constant pulse width each time the level of the signal to be transmitted is equal to the output level of said saw-tooth generator.

3. The device of claim 1 further comprising an amplifier coupled to the output of said pulse generator;

laser diode means coupled to said amplifier for generating a light pulse output;

lens means for focusing and transmitting the output of said laser diode.

* * * * *